United States Patent [19]

Gibson et al.

[11] Patent Number: 5,155,580
[45] Date of Patent: Oct. 13, 1992

[54] SIDE PANEL SIGNAL PROCESSOR FOR A WIDESCREEN TELEVISION SYSTEM

[75] Inventors: James J. Gibson, Princeton; Robert N. Hurst, Jr., Hopewell; Jack S. Fuhrer, Princeton Junction; Terrence R. Smith, Westmont, all of N.J.

[73] Assignee: General Electric Company, Princeton, N.J.

[21] Appl. No.: 638,301

[22] Filed: Jan. 7, 1991

[51] Int. Cl.⁵ .................. H04N 7/00; H04N 11/00
[52] U.S. Cl. ............................... 358/12; 358/141
[58] Field of Search ............. 358/21 R, 12, 16, 140, 358/141, 142, 183, 17

[56] References Cited

U.S. PATENT DOCUMENTS

| | | | |
|---|---|---|---|
| 4,816,899 | 3/1989 | Strolle et al. | 358/12 |
| 4,855,811 | 8/1989 | Isnardi | 358/12 |
| 4,912,549 | 3/1990 | Altman | 358/17 |
| 4,933,765 | 6/1990 | Schiff | 358/141 |
| 4,992,873 | 2/1991 | Koslov | 358/12 |
| 5,005,082 | 4/1991 | Zdepski | 358/135 |

Primary Examiner—Tommy P. Chin
Attorney, Agent, or Firm—Joseph S. Tripoli; Eric P. Herrmann; Ronald H. Kurdyla

[57] ABSTRACT

In a television signal processing system of the type which encodes an auxiliary carrier modulated with auxiliary image information in line format, which carrier is placed within the spectral band of standard television signal components, and wherein the modulated auxiliary carrier tends to interfere with the standard television signal, the interference is minimized by spatially variably attenuating the auxiliary image information. The attenuation function is selected to apply greater attenuation to the auxiliary image information at the extremities of the lines than toward the center of the lines.

28 Claims, 6 Drawing Sheets

SIDE PANEL SIGNAL PROCESSOR FOR A WIDESCREEN TELEVISION SYSTEM

FIELD OF THE INVENTION

This invention concerns apparatus for processing signals for an extended definition television system.

BACKGROUND OF THE INVENTION

A conventional television system, such as a system in accordance with the NTSC broadcast standard adopted in the United States and elsewhere, processes a television signal representative of an image with a 4:3 aspect ratio (the ratio of the width to the height of a displayed image). Recently, there has been interest in using higher aspect ratio images for television systems, such as 5:3, 16:9 and 2:1, since such higher aspect ratios more nearly approximate or equal the aspect ratio of the human eye compared to the 4:3 aspect ratio of a standard television display. Advanced television systems for producing 5:3 aspect ratio images are described, for example, in U.S. Pat. No. 4,816,899—Strolle, et al. and in U.S. Pat. No. 4,855,811—Isnardi. In these systems side panel image information is encoded by time compressing low frequency side panel luminance and chrominance information into horizontal overscan regions, and high frequency side panel luminance and chrominance information are encoded by time expansion and modulation of an auxiliary subcarrier. The side panel luminance information component (Y) and the side panel chrominance color difference information components (I and Q) are each processed separately before being encoded.

The auxiliary subcarrier, modulated by the high frequency side panel luminance and chrominance information, phase alternates from field-to-field, and is located within the frequency spectrum occupied by baseband composite video. In order to insure that this signal does not cause objectional interference in the compatible NTSC signal, it is attenuated relative to other components of the encoded signal. However if this signal is sufficiently attenuated to preclude any observable interference in the compatible NTSC signal, an undesirable result may occur in the widescreen receiver. Because these components are attenuated relative to other components of the widescreen television signal, on detection at the widescreen receiver they exhibit a poorer signal-to-noise ratio. Consequently, when the center and side panel signals are recombined, the seams where the center and side panel information are joined may be objectionally made evident by differences in the noise content between the center and side panel images.

SUMMARY OF THE INVENTION

The present invention is a system for attenuating a television signal component in accordance with the spatial position the signal represents. In an exemplary embodiment, side panel information is variably attenuated before encoding, such that signal representing image information near a center-side seam is attenuated less than signal representing image information near the edge of the displayed picture. When the transmitted signals are decoded and center and sidepanel components are recombined, the noise quality on both sides of the seam are similar and consequently attention is not drawn to the seam. Nominally in this system, the attenuation of the side panel components near the edge of the picture is greater than the uniform attenuation applied in the prior systems to side panel signals representing the entire side panel area. On average however the side panel energy is reduced a comparable amount so that interference with the NTSC compatible components does not occur.

DETAILED DESCRIPTION

Figure 1:
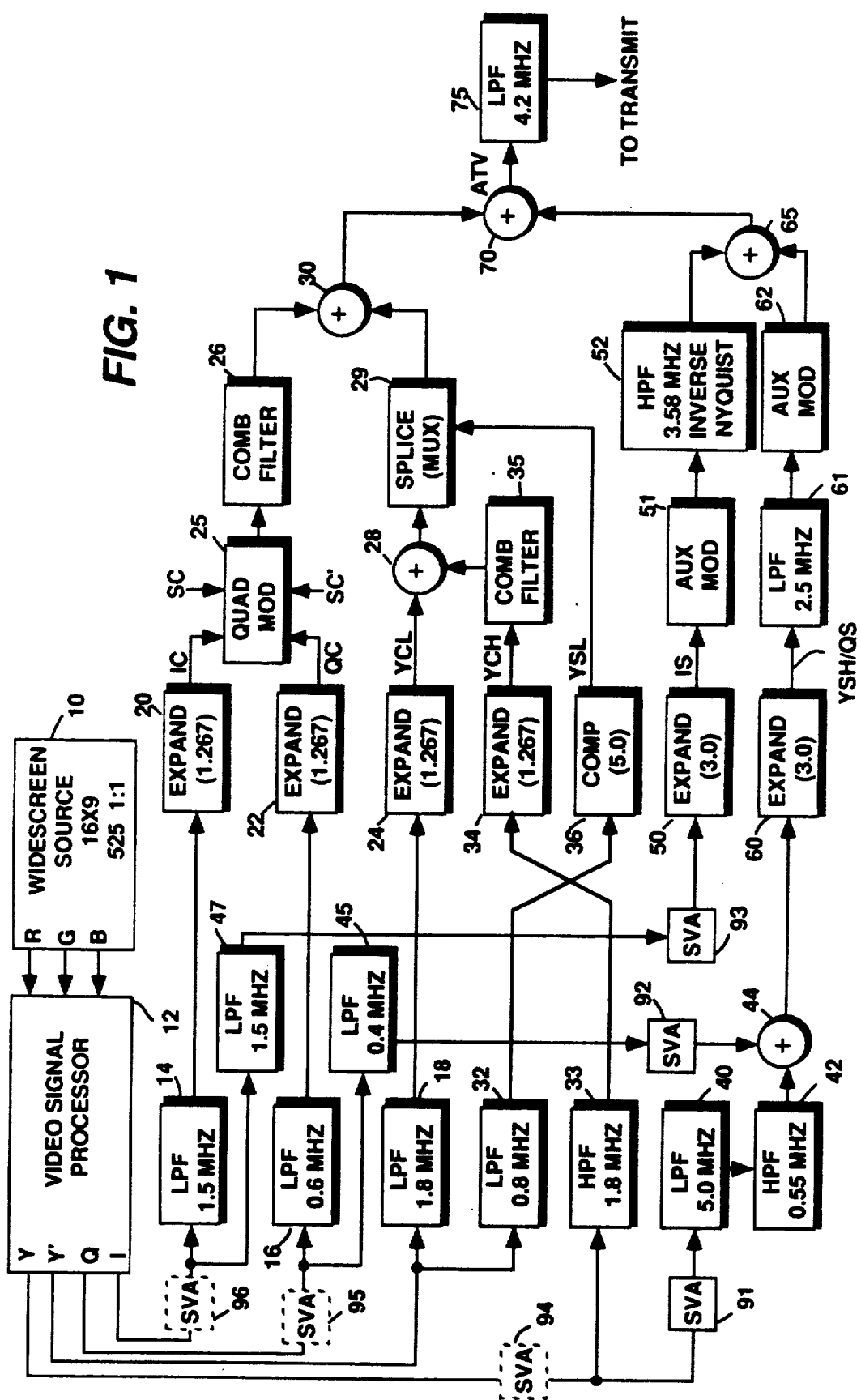
FIG. 1 shows a portion of an NTSC compatible widescreen transmitter/encoder including apparatus according to the present invention.
Figure 2:
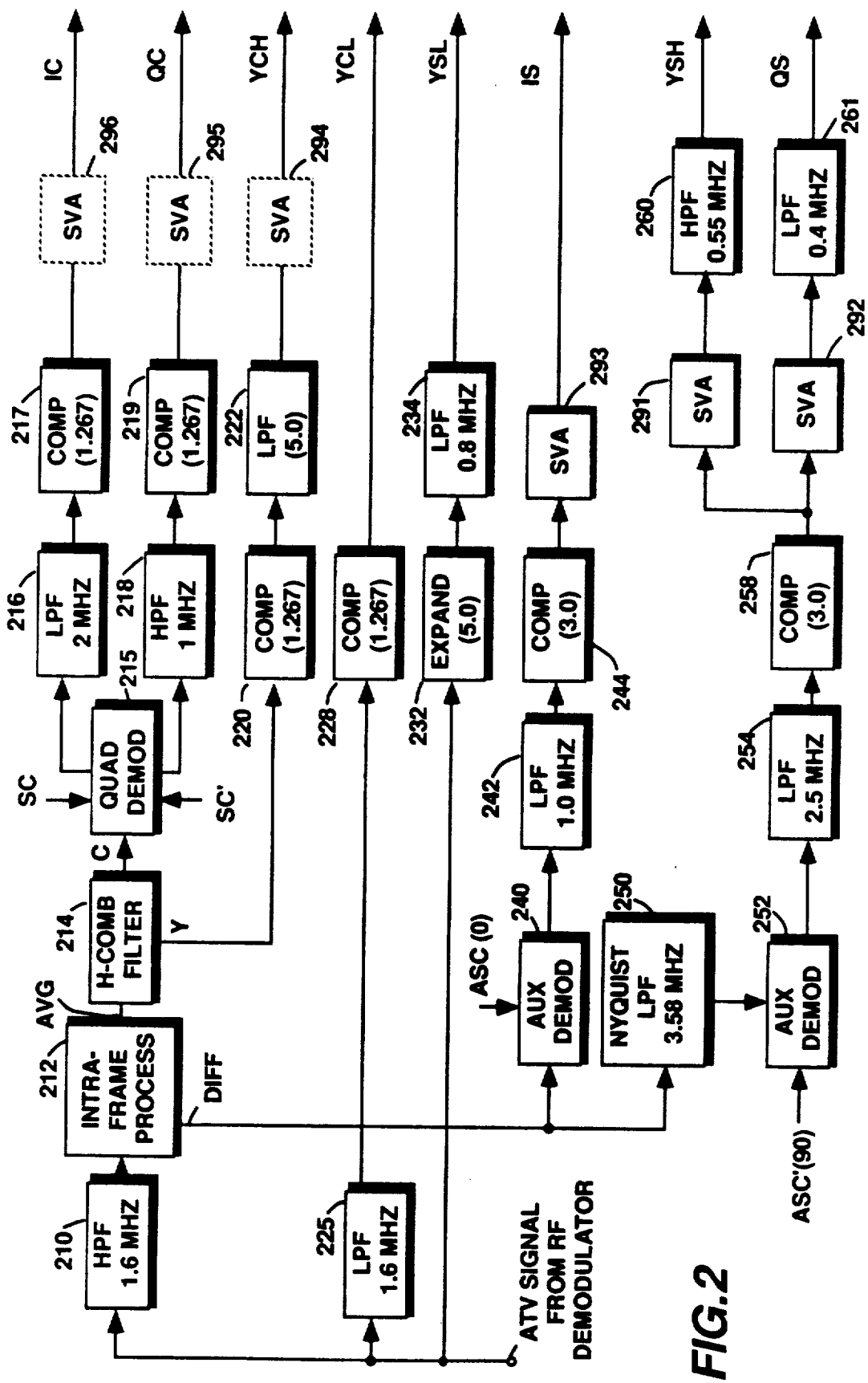
FIG. 2 shows a portion of an NTSC compatible widescreen receiver/decoder including apparatus according to the present invention.
Figure 3:
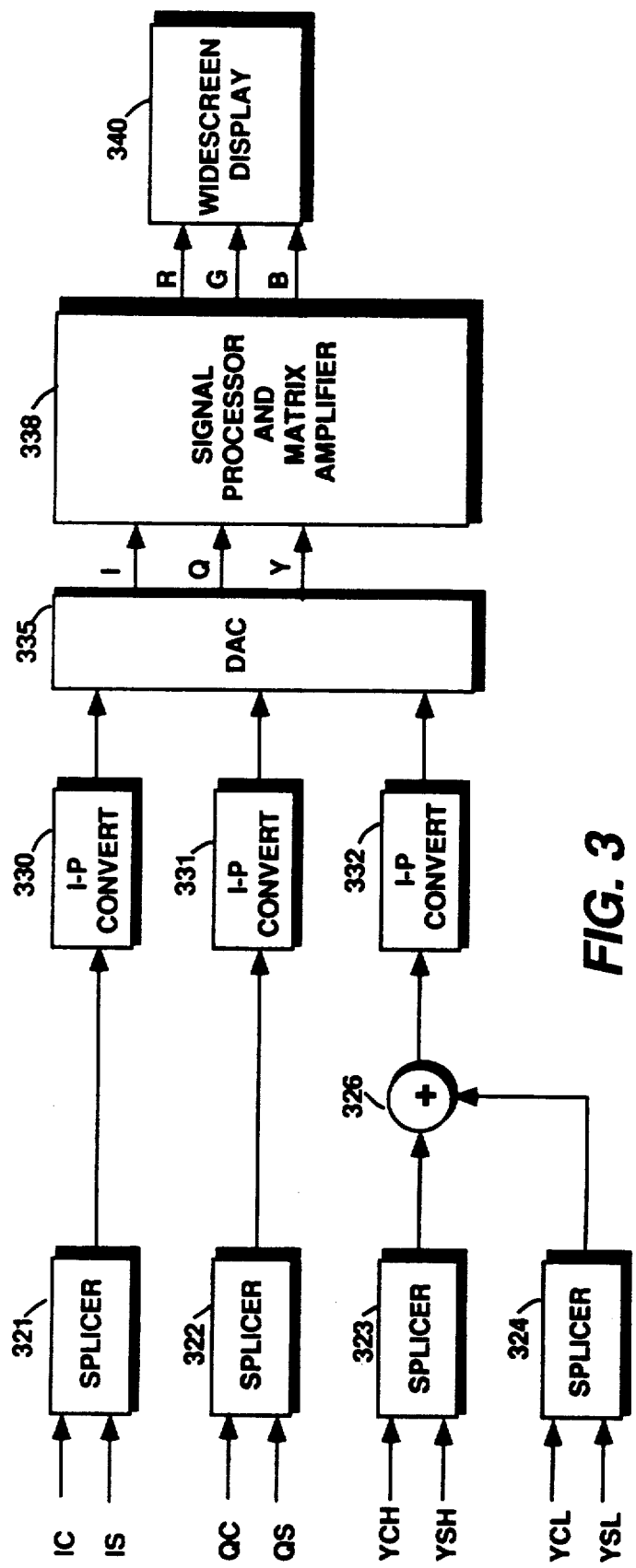
FIG. 3 shows an additional portion of the receiver/decoder of FIG. 2.

Before describing the invention a brief description of an environment in which it may be utilized will be presented with reference to FIGS. 1, 2 and 3. FIGS. 1, 2 and 3 show an encoder and decoder, respectively, of an EDTV system. In the NTSC compatible widescreen transmitter/encoder of FIG. 1, a widescreen television signal source 10, such as a color television camera, provides a 16×9 wide aspect ratio 1:1 progressively scanned (non-interlaced) television signal with color components R, G and B. These signals are processed by a video signal processor 12 to provide luminance output signals Y, Y' and color difference output signals I and Q. Processor 12 includes circuits for matrixing the R, G, B input signals to I, Q, Y format, vertical-temporal filters for pre-filtering each of the I, Q, Y signals, and non-interlaced scan to interlaced scan converters for each of the I, Q, Y signals. Output signals I, Q and Y from processor 12 are 262 line non-interlaced scan signals. An output signal Y' is a 525 line interlaced scan luminance signal.

Encoding of the main (i.e., "center") panel information will be discussed first. Color difference signals I, Q and luminance signal Y' from unit 12 are respectively filtered by filters 14, 16 and 18 before being time expanded by units 20, 22 and 24, respectively. Units 20, 22 and 24 exhibit a time expansion factor of 1.267 and operate only on the center panel portion of the I, Q, Y' signals from filters 14, 16 and 18. Thus time expanders 20 and 22 respectively provide output center panel color difference signals IC and QC. Time expander 24 provides an output luminance center panel low frequency signal YCL. Signals IC and QC quadrature modulate 3.58 MHz quadrature phased subcarriers SC and SC' in a modulator 25 to produce a modulated center panel chrominance signal CC. This signal is processed by a line comb filter 26 to remove information, in spectral regions normally occupied by luminance signal, before being applied to a center panel chrominance input of an adder 30.

The center panel luminance signal input to adder 30 is developed as follows. The Y luminance signal from processor 12 is high pass filtered by a unit 33 and time expanded by a unit 34, which operates only during the center panel interval, to develop a center panel high frequency luminance signal YCH. This signal is processed by a line comb filter 35 to remove information, in spectral regions normally occupied by chrominance signal, before being combined with center panel low frequency luminance signal YCL in adder 28 to produce a center panel luminance signal YC.

Expanded center panel luminance signal YC is spliced to compressed side panel low frequency luminance information YSL by means of a multiplexer 29. Briefly, as discussed in detail in U.S. Pat. No. 4,855,811—Isnardi, signal YSL constitutes time compressed low frequency left and right side panel luminance information which is placed in left and right horizontal overscan regions of the center panel signal by means of multiplexer 29. Signal YSL is obtained by filtering signal Y' from processor 12 by means of a 0.8 MHz horizontal low pass filter 32, then selectively time compressing the side panel portions of the filtered signal by means of a compressor 36 which operates only during the side panel intervals. Signal YSL from compressor 36 is applied to the splicer 29. The output of multiplexer/splicer 29 is applied to the luminance input of a center panel signal combiner 30.

High frequency side panel information is processed as follows. The "I" color difference component from processor 12 is filtered by a 1.5 MHz low pass filter 47 to produce a wideband I signal. The output signal from unit 47 is time expanded during side panel intervals by a time expander 50 to produce wideband side panel color difference component IS. This signal is applied to an auxiliary modulator 51 for amplitude modulating an auxiliary subcarrier ASC with a nominal 0° phase. Subcarrier ASC exhibits a frequency of 3.58 MHz, the frequency of the standard chrominance subcarrier, but exhibits a phase which inverts from field-to-field unlike the standard chrominance subcarrier. Specifically, the phase of signal ASC inverts every 262 horizontal lines (262H).

The modulated signal from unit 51 is applied to a 3.58 MHz horizontal high pass filter 52 having an complex conjugate Nyquist slope. Filter 52 mirrors a filter at a receiver having a Nyquist slope to achieve a desired amplitude response at a receiver demodulator. Specifically, the cascading of a complex conjugate Nyquist slope filter 52 at the encoder with a Nyquist slope filter at a receiver decoder (as will be seen in FIG. 2) produces a desired flat amplitude response for high frequency side panel luminance signal YSH when demodulated at the receiver. Such cascade of Nyquist slope filters also assures that modulated auxiliary subcarrier ASC exhibits symmetrical double sideband IS information so that proper quadrature demodulation is achieved at the decoder.

Side panel high frequency luminance information and the side panel color difference component "Q" are combined for processing. The Q output signal from processor 12 is conveyed via a 0.4 MHz horizontal low pass filter 45 to a combiner 44, where it is combined with signal Y from unit 12 after filtering by a 5.0 MHz horizontal low pass filter 40 and a 0.55 MHz horizontal high pass filter 42. The output signal from combiner 44 is processed by a time expander unit 60. Expander unit 60 operates during the side panel intervals for producing combined side panel highs signal YSH/QS, i.e., side panel high frequency luminance information combined with side panel Q color difference information. Because time expander 60 is not ideal, low energy repeat spectra are generated above 2.5 MHz. Low pass filter 61 removes these repeat spectra and prevents them from cross-talking into the main (center) panel component after modulation.

Combined signal YSH/QS is coupled via the 2.5 MHz horizontal low pass filter 61 to an auxiliary modulator 62, which modulates an auxiliary 3.58 MHz subcarrier ASC' with the output signal from the filter 61. Subcarrier ASC' is in phase quadrature with subcarrier ASC and exhibits a similar phase inversion from field to field. The output signal from the modulator 62 and the output signal from the filter 52 are combined in an adder 65. An adder 70 combines the output signals from adders 30 and 65 to produce a compatible widescreen advanced television signal ATV. This signal is low pass filtered by a 4.2 MHz filter 75 to restrict signal ATV to the standard NTSC channel bandwidth before being applied to an RF transmitter for broadcast.

FIG. 2 shows a portion of a widescreen television receiver including apparatus for decoding the widescreen ATV signal generated by the arrangement of FIG. 1. A received baseband encoded ATV signal (e.g., from an RF tuner and demodulator assembly not shown) is applied to a 1.6 MHz horizontal high pass filter 210, the output of which is applied to an intraframe processor 212. Processor 212 averages (additively combines) and differences (subtractively combines) image lines 262H apart within frames, to recover high frequency center panel signal information above 1.6 MHz, at an output AVG. Modulated side panel high frequency information is provided at a differencing output DIFF of processor 212.

The center panel component from the AVG output of processor 212 is filtered by a horizontal line comb filter 214 to provide separated luminance (Y) and chrominance (C) output components. The separated center panel luminance component is time compressed by a unit 220, which operates only during the center panel interval, to restore separated center panel component Y to its original spatial relationship. The time compressed signal from unit 220 is then filtered by a 5.0 MHz horizontal low pass filter 222 to develop center panel luminance high frequency component YCH. The separated center panel chrominance information (C) is quadrature demodulated by a demodulator 215 responsive to quadrature phased reference signals SC and SC' having the frequency and phase characteristics of corresponding subcarrier signals provided at the encoder/transmitter. Demodulated center panel I and Q color difference components IC and QC are horizontally low pass filtered by filters 216 and 218 respectively before being time compressed by units 217 and 219. Time compression units 217 and 219 operate during the center panel intervals to restore the original spatial relationship of signals IC and QC.

The center panel low frequency luminance information is restored to its original form by means of filter 225 and time compressor 228. Horizontal low pass filter 225 passes frequencies of input signal ATV which are below about 1.6 MHz to time compressor 228, which operates during the center panel interval to restore low frequency center panel luminance information to its original spatial relationship, as signal YCL.

The input ATV signal is also applied to a time expander 232 which operates during the side panel intervals to restore the original spatial format of the side panel information which had been time compressed and placed in the horizontal overscan regions. The output signal from expander 232 is processed by a 0.8 MHz horizontal low pass filter 234 to provide low frequency side panel luminance signal YSL in its original spatial form.

To recover side panel I color difference component IS, the signal from the DIFF output of processor 212 is demodulated by an auxiliary demodulator 240 which responds to an auxiliary reference signal ASC having the same frequency and phase characteristics as subcarrier ASC developed at the encoder. The demodulated signal from unit 240 is filtered by a 1.0 MHz horizontal low pass filter 242, time compressed during side panel intervals by a unit 244 to restore the original spatial format of the signal component, to produce side panel color I difference component IS.

To recover side panel components YSH and QS, the signal from the DIFF output of processor 212 is processed by a 3.58 MHz horizontal low pass Nyquist slope filter 250 before being demodulated by auxiliary demodulator 252. With regard to the use of Nyquist filter 250 it is noted that in this example component QS is a double sideband signal modulation component of auxiliary subcarrier ASC' occupying 3.38 MHz to 3.79 MHz, and component YSH is a (lower) single sideband modulation component of auxiliary subcarrier ASC' occupying a frequency band of 1.78 MHz to 3.25 MHz. Imparting a Nyquist slope to the higher energy double sideband region of the combined YSH/QS modulated signal (from 3.08 MHz to 4.08 MHz) reduces the effective energy of the double sideband region by one-half, so that a flat demodulation amplitude response results over the auxiliary subcarrier modulation frequencies. Demodulator 252 also responds to an auxiliary reference signal ASC' having the same frequency and phase characteristics as auxiliary subcarrier ASC' developed at the encoder. A demodulated output signal from demodulator 252 contains combined YSH and QS components and is filtered by a 2.5 MHz horizontal low pass filter 254.

The output signal from filter 254 is time compressed by a unit 258 which operates during side panel intervals to restore the original spatial relationship of the combined YSH/QS side panel information. The time compressed signal is separated into the YSH and QS components by means of a 0.55 MHz horizontal high pass filter 260, and a 0.4 MHz horizontal low pass filter 261, respectively.

The described processing of side panel components QS and YSH as a combined signal results in a less complicated system with improved performance. Fewer time compressor/expander units and modulators are needed. The hardware savings are especially significant in the case of a decoder in a consumer television receiver. The 0.55 MHz lower cut-off frequency of signal YSH is determined by filter 42 in FIG. 1, and the 0.4 MHz upper cut-off frequency of signal QS is determined by filter 45 in FIG. 1. Furthermore, processing the QS and YSH components as a combined signal means that any crosstalk or harmonics associated with non-linear processing at the encoder are more effectively cancelled at the decoder.

The output signals developed by the decoder apparatus of FIG. 2 are processed further as shown in FIG. 3. Signals IC and IS, QC and QS, YCH and YSH, and YCL and YSL are respectively spliced by splicers 321, 322, 323 and 324 respectively. Output signals from splicers 323 and 324 are combined by an adder 326 to provide a restored widescreen luminance signal with main panel and side panel information. The widescreen chrominance signals from splicers 321 and 322 and the widescreen luminance signal from adder 326 are converted from interlaced to progressive scan format by means of converters 330–332 before being converted to analog form via a digital-to-analog converter unit 335. Widescreen analog signals I, Q, Y are matrixed and processed by conventional video signal processing circuits in a network 338 to produce color image representative signals R, G and B suitable for display by a widescreen image reproducing device 340.

Referring again to FIG. 1, the signal produced by the adder 30 is a standard composite video signal, albeit with additional information in the horizontal overscan regions. Higher frequency side panel information is provided by the adder 65 in the form of a modulated auxiliary carrier having the same frequency as the standard chrominance subcarrier, but alternating in phase from field to field. Theoretically, this auxiliary signal should be transparent or imperceptible on a standard receiver. However, unless the auxiliary signal is significantly attenuated relative to the standard signal components, it will produce perceptible artifacts in images displayed by standard receivers. Typically, attenuation is performed on the signal provided by the adder 65. However, as mentioned previously, this method tends to render the center-side panel seams obvious due to differences in center and side panel noise characteristics.

The present invention overcomes this problem by spatial variable attenuation (SVA) of the side panel signals. What this means is that signal representing side panel image information is attenuated in such fashion that it is continuous with the center panel image information at the center-side panel seams. The spatially variable attenuation function is arranged such that the average energy of the auxiliary signal is sufficiently low to not be perceived on standard receivers. The absolute value of the energy is subjectively established by viewing preferences.

Figure 4:
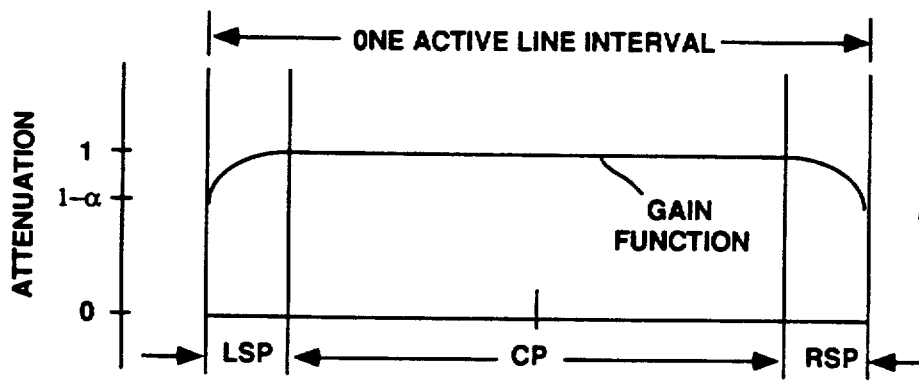
FIGS. 4, 5, 6 and 6A are pictorial representations of spatially variable transfer functions useful for understanding the invention.

Refer to FIG. 4 which illustrates one spatially variable attenuation function. FIG. 4 shows the attenuation function of a video signal over an entire horizontal active line interval including a left side panel region, LSP, a center panel region, CP, and a right side panel region, RSP. The center panel is not attenuated, and it may be seen that there is no attenuation of the side panel regions at the center/side interfaces. Proceeding from the center/side interfaces, across the side panel regions, the signal is attenuated in increasing degrees as the extremities of the active line intervals are approached. The attenuation function is shown to be generally parabolic, but may be linear or piece-wise linear. A representative parabolic attenuation function, $SVA_{S1}$, over the side panel region is $$SVA_{S1} = 1 - \alpha((P - N_S)/N_S)^2 \quad 0 \leq P \leq N_S \quad (1)$$

where $\alpha$ is a scale factor which determines the maximum attenuation at the edge of the image, P is the horizontal position within the sidepanel region and $N_S$ is the width of the side panels. Alternatively, P is the current pixel number ranging from $0 - N_S$ and $N_S$ is the total number of pixels in a side panel region.

Figure 5:
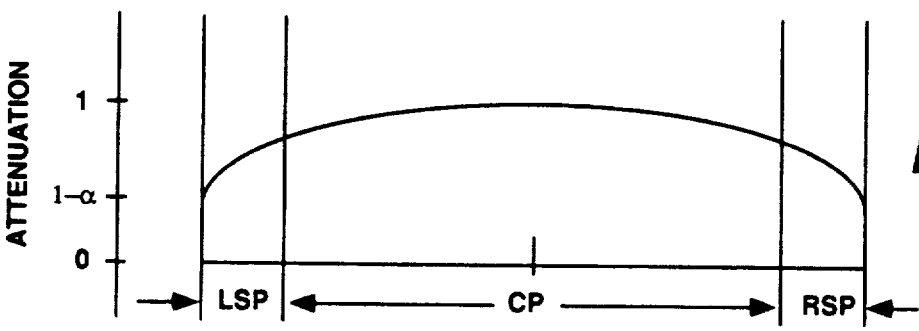

FIG. 5 shows an alternative spatial attenuation function wherein attenuation is applied not only to the side panel regions but also to the center panel region. Using the attenuation function of FIG. 5, the degree of attenuation at the extremities may be reduced resulting in a generally more pleasing image. In general the attenuation applied in the center panel region is not sufficient to significantly degrade the image displayed on standard receivers. An exemplary attenuation function $SVA_L$ of the type illustrated in FIG. 5 for application across the entire active line interval is given by $$SVA_L = 1 - \alpha((P - N_L/2)/N_L/2)^2 \quad (2)$$

where $N_L$ is equal to the number of active pixels in an entire line interval and P is a variable corresponding to respective pixel numbers. Note that for P equal to zero or $N_L$, $SVA_L$ is equal to $1 - \alpha$, and for P equal to $N_L/2$, $SVA_L$ is equal to one.

Figure 6:
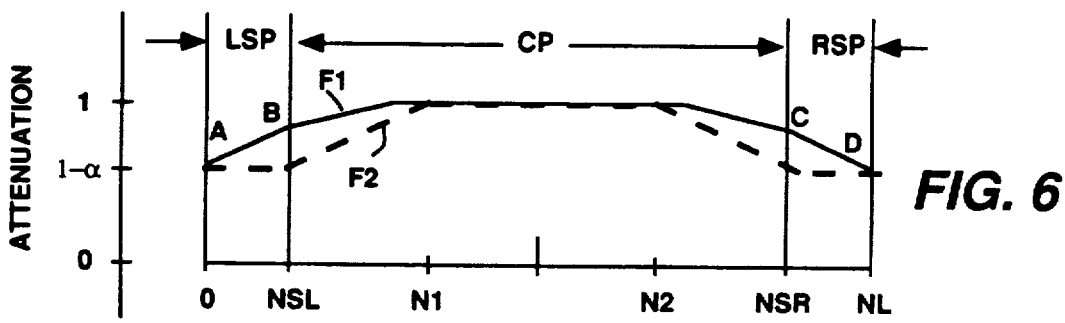

FIG. 6 shows two piecewise linear spatial attenuation functions F1 and F2 for use where attenuation is performed over the entire active line interval. The function F2 is currently the preferred attenuation function utilized in the EDTV system shown in FIG. 1. The function F2 applies constant attenuation across the side panel regions and spatially variable attenuation in the center panel region.

Spatially variable attenuation may be applied to the luminance signal, the chrominance signal or both. Typically the amount of attenuation applied to the luminance component is different from the attenuation applied to the chrominance components. For example, if attenuation is applied over the entire line interval according to equation (2) exemplary values of $\alpha$ for the high frequency luminance component and the chrominance components are 1.0 and 0.6 respectively.

Referring again to FIG. 1 spatially variable attenuators (SVA's) are shown for performing a) attenuation only over the side panel regions (elements 91, 92 and 93) or b) attenuation over the entire active line intervals (elements 94, 95 and 96). In the first mode, the spatially variable attenuator, SVA 91 is coupled between the processor 12 and the lowpass filter 40 to attenuate the side panel high frequency luminance component. An SVA 92 is coupled between the lowpass filter 45 and the adder 44, and an SVA 93 is coupled between the lowpass filter 47 and the expander circuit 50 to spatially attenuate the Q and I side panel color difference signals respectively. The SVA's 91, 92 and 93 are timed to operate during the occurrence of the left and right side panel signals. Exemplary SVA's 91-93 will be described below with reference to FIGS. 7 and 8.

Spatially variable attenuation over the entire active line intervals is accomplished with the spatially variable attenuators SVA's 94-96, shown in phantom. The high frequency luminance component Y is attenuated by SVA 94 coupled between the processor 12 and the high pass filter 33 and the lowpass filter 40. The Q component is attenuated by the SVA 95 coupled between the processor 12 and the lowpass filters 16 and 45 and the I component is attenuated by the SVA 96 coupled between the processor 12 and the lowpass filters 14 and 47. Exemplary circuitry of the SVA's 94-96 will be described with reference to FIG. 9. Note that the SVA's 94-96 may be incorporated in the processor 12 at a point immediately after the Y, I and Q signals are generated.

Figure 7:
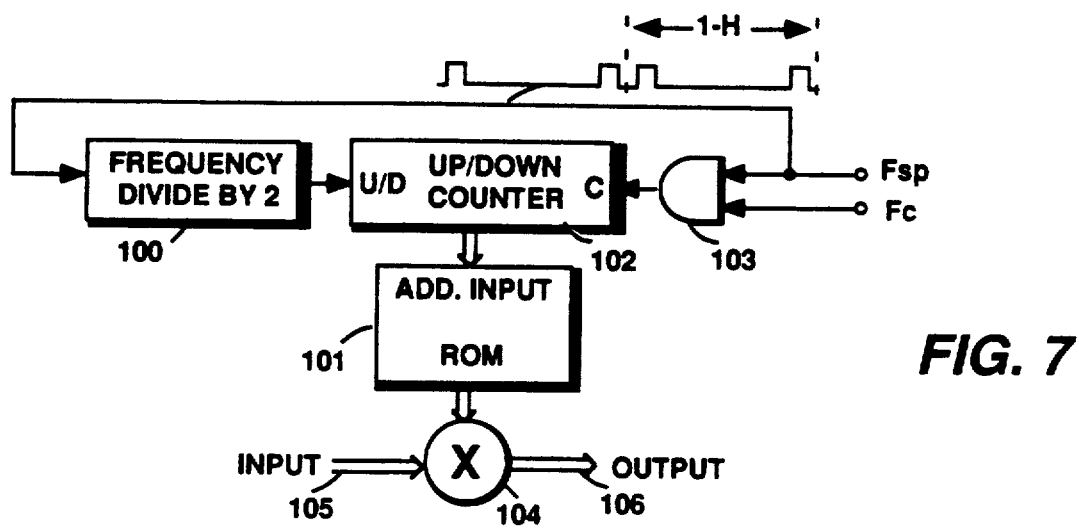
FIGS. 7, 8, 9, 10, 11 and 12 are block diagrams of alternative spatially variable gain/attenuation circuitry which may be utilized in the encoder and decoder of FIGS. 1 and 2.
Figure 8:
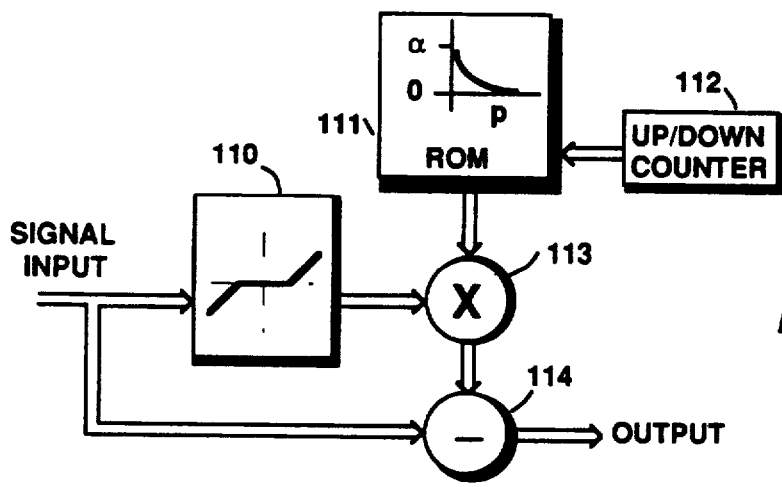

FIGS. 7 and 8 are diagrams of circuitry for providing a spatially variable attenuation/gain function over respective side panel intervals. In FIG. 7 a read-only memory (ROM) 101 is programmed at respective memory locations P with the function $$1 - \alpha((P - N_S)/N_S)^2 \quad (3)$$

The values P, from zero to $N_S$, are provided by an up/down counter 102 at a rate corresponding to the input sample rate. The attenuation factors provided by the ROM 101 are coupled to the multiplier input port of a scaling circuit 104. The signal, INPUT, to be spatially variably attenuated is coupled to the multiplicand input port of the scaling circuit 104. Scaling circuit 104 provides the attenuated signal at its output port OUTPUT.

In this embodiment the up/down counter is conditioned to count up from zero to $N_S$ during the occurrence of the left side panel signal, and to count down from $N_S$ to zero during the occurrence of the right side panel signal. This is accomplished by gating a sample rate clock signal Fc to the clock input terminal C only during the occurrence of side panel signals. Gating is accomplished by an AND gate 103 having the clock signal Fc applied to a first input terminal and a further clock signal Fsp applied to a second input terminal. The clock signal Fsp contains pulsed intervals which occur coincident with sidepanel information. Up/down count control is accomplished by dividing the clock signal Fsp by two and applying this half rate clock signal to the up/down control input terminal, U/D, of the counter. Operated in this manner the ROM 101 provides side panel attenuation factors which are symmetric with respect to the center of the active image line.

In the application of FIG. 1 low amplitude high frequency luminance signal values contribute little to the overall energy content of the auxiliary signal, but do contribute significantly to the widescreen image quality. Therefore, it was found to be advantageous to attenuate only the larger amplitude signal values of this signal. This is accomplished with the circuit arrangement of FIG. 8.

In FIG. 8 a ROM 111 is programmed at respective memory locations P with an attenuation function of the form $\alpha((P-N_S)/N_S)^2$ for example. The values P from zero to $N_S$ (left side panel) and from $N_S$ to zero (right side panel) are applied to the ROM 111 address input port by an up/down count circuitry 112 which may be similar to the counter circuitry of FIG. 7.

The attenuation factors (ranging from $\alpha$ to zero) provided by the ROM 111 are applied to the multiplier input port of a scaling circuit 113. Signal to be attenuated is applied to a coring circuit 110 which passes only signal components having amplitude values greater than a predetermined threshold. The cored signal is coupled to the multiplicand input port of the scaling circuit 113. Cored and attenuated signal provided by the scaling circuit 113 is coupled to the subtrahend input port of a signal subtracting circuit 114. Input signal to be variably attenuated is coupled to the minuend input port of the subtracting circuit 114 which provides a signal having only large amplitude excursions spatially variably attenuated at its output terminal OUTPUT.

Assume that the input signal is composed of amplitude components LA greater than the threshold of the coring circuit and amplitude components SA lesser than the threshold, i.e., the input signal is equal to I(LA, SA). The coring circuit 110 passes only I(LA) which is then scaled by $\alpha((P-N_S)/N_S)^2$. This scaled component is subtracted from I(LA, SA) producing the signal $$OUTPUT = I(LA(1 - \alpha((P - N_S)/N_S)^2), SA) \quad (4)$$

which is the desired result wherein signal samples corresponding to P=0 exhibit maximum attenuation of $1-\alpha$.

Figure 9:
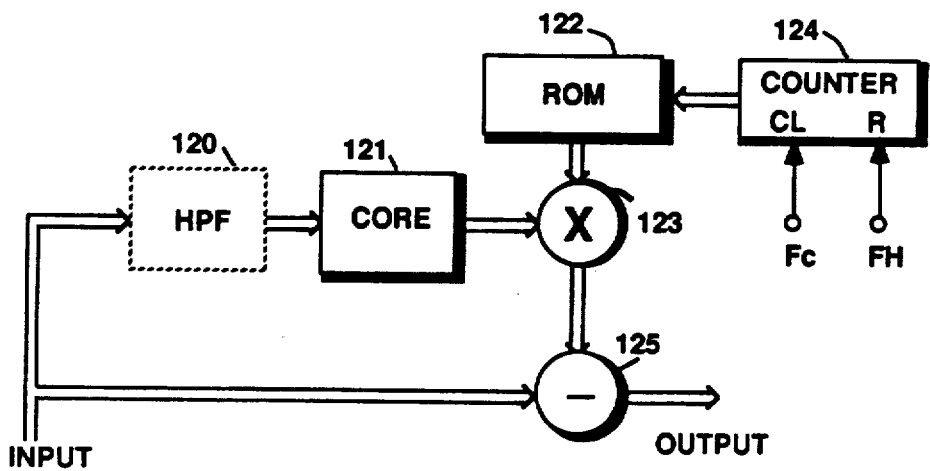

The circuit of FIG. 9 is arranged to spatially variably attenuate signal over the entire active line interval. Absent the high pass filter 120 it operates similarly to the circuitry of FIG. 8 except that the counter 124 used to address the ROM is conditioned to count, and thereby provide ROM addresses, over the entire active line interval. The counter 124 is reset to zero by a reset clock $F_H$ at the beginning of the active line interval. Thereafter the counter is conditioned to count, and provide ascending (or descending) address values by a clock signal Fc having a frequency equal to the input sample rate (or a submultiple thereof).

An exemplary attenuation function, $SVA_L'$, programmed into the ROM 122 may be $$
\begin{aligned}
SVAL' &= \alpha & 0 \leq P \leq N_{SL} \text{ and } N_{SR} \leq P \leq N_L \quad (5)\\
&= \alpha - \alpha_1(P - N_{SL}) & N_{SL} < P \leq N_1 \\
&= 0 & N_1 < P < N_2 \\
&= \alpha_1(P - N_2) & N_2 \leq P < N_{SR}
\end{aligned}
$$

where $N_{SL}$ and $N_{SR}$ correspond to the sample numbers at the left and right side-center seams, $N_L$ corresponds to the number of active samples in a line, $N_1$ and $N_2$ correspond to arbitrary samples symmetric about the center point and $\alpha_1 = \alpha/(N_1 - N_{SL})$. The function defined by equation (5) corresponds to the function F2 illustrated in FIG. 6.

Consider that the luminance SVA is to be located in the processor 12 before the luminance signal is split into the higher and lower frequency components Y and Y'. In this instance the high pass filter 120 is included in the signal path coupled to the multiplicand input port of the scaling circuit 123. The output provided by the subtracting circuit 125 will be a signal in which only high frequency, large amplitude components are spatially variably attenuated.

The coring threshold value and the attenuation factors $\alpha$ tend not to be independent. That is, if the attenuation factor is increased, the coring threshold should be increased also.

Figure 6A:
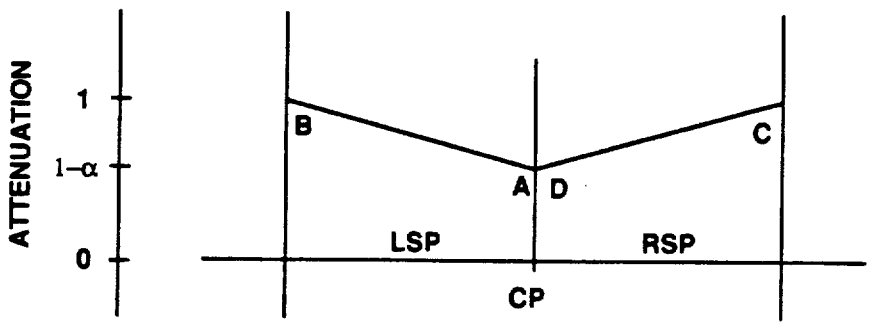

The visual appearance of the interference caused by the side panel information carried on the auxiliary carrier in standard receivers may be further diminished by transposing the side panel information horizontally. The side panel information corresponding to the ends of the active line interval is attenuated to a greater degree than the information at the center-side seams. Thus the side panel signal representing the ends of the line will produce the least interference. If the attenuated side panel signal representing the ends of the lines is transposed to occupy the center of the lines there will be less signal energy to cause interference at the center of the image reproduced by a compatible standard receiver, and thus the interference will tend to be less noticeable by the viewer. Refer to FIGS. 6 and 6A. In FIG. 6 the attenuation function F1 has maximum attenuation applied to the extremities A and D of the active line, and lesser attenuation is applied at the seams B and C. The side panel information is expanded to substantially fill the entire interval occupied by the center panel before modulating the auxiliary carrier. FIG. 6A shows the desired transposed attenuation function as realized on an expanded version of the side panel information. Note that the ends A and D of the side panel information have been spatially translated to the center of the line while the information occurring at the seams has been spatially translated to the ends of the center panel region. By virtue of this spatial translation of the spatially variable attenuated side panel information, signal energy is minimized at the center of the horizontal lines.

Figure 12:
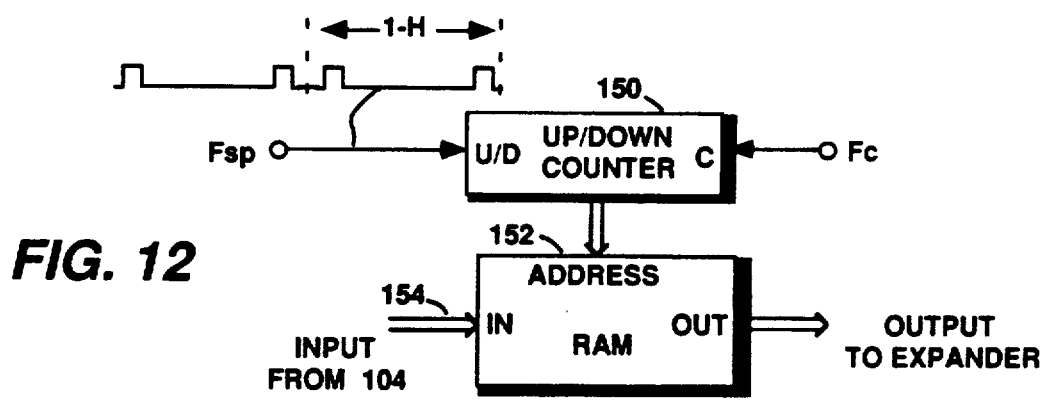

Spatial translation of the spatially variable attenuated side panel information may be accomplished by the exemplary circuitry of FIG. 12. In FIG. 12, variably attenuated side panel signal from for example the scaling circuit 104 of FIG. 7, is applied to an input port 154 of a random access memory (RAM) 152. RAM 152 has sufficient memory to store the information of one side panel interval. After the information from one side panel has been stored in the RAM, it is read out of the RAM in reverse order, and applied to the appropriate expander circuit.

Addressing of the RAM 152 is accomplished with an up/down counter 150 arranged to count from zero to $N_S - 1$. The counter 150 counts responsive to a clock signal Fc having a clock rate equal to the input sample rate and synchronous therewith. The counter 15 is conditioned by a sidepanel signal Fsp to count up (down) during the sidepanel intervals and to count down (up) otherwise. The counter is arranged to be non-wrapping, that is, it provides no output values greater than $N_S - 1$ or less than zero.

If spatial translation is applied to the variably attenuated side panel signals as discussed above, it may be necessary to include compensating delay elements in the signal paths not including such translation. The compensating delay time corresponds to one side panel interval. With respect to FIG. 1 such a delay element may be required in each of the center panel signal paths. Note further, that if side panel signal translation is performed at the encoder/transmitter, the inverse translation must be performed at the receiver. The inverse translation at the receiver will be located after the sidepanel information is compressed (e.g., after compressors 258, 244), and may be performed with apparatus similar to that illustrated in FIG. 12. Alternatively the inverse translation may be built into the compressor 258 since it likely contains memory for storing and reading signal values.

At the widescreen receiver it is not necessary to compensate for the spatial variable attenuation of the side panel high frequency luminance and chrominance signals. The reproduced image will appear to have been captured with a lens having slightly nonlinear flat field response. Image quality will degrade slightly at the edges of the display, but since the points of interest are normally at the center of the image, this effect will seldom be noticeable.

However the spatial variable attenuation of the sidepanel signals may be undone by including inverse spatially variable gain elements in the receiver (hereafter referred to as spatial variable attenuators SVA's). These SVA's are preferably located in the receiver (FIG. 2) to operate on signals of the same form as the corresponding SVA's in the encoder. For example, if an SVA in the encoder operates on time compressed (expanded) signal, the corresponding SVA in the receiver is positioned to operate on time compressed (expanded) signal also to insure symmetric response characteristics. In the encoder of FIG. 1 the respective SVA's are located before time expansion of the respective signals. Thus, in the corresponding receiver of FIG. 2 the inverse SVA's are located after the respective signals have been time compressed. The I chrominance SVA 293 is included after the time compressor 244, the luminance SVA 291 and the Q chrominance SVA 292 are included after the time compressor 258. These two latter SVA's may be included after the high and low-pass filters 260 and 261 respectively.

If respective signals have undergone spatially variable attenuation using an SVA similar to the SVA illustrated in FIG. 7 inverse SVA'S 291, 292 and 293 may be realized similar to the SVA illustrated in FIG. 7. In this instance the inverse SVA will include a ROM 101 which is programmed with the inverse of the attenuation function. Thus if the encoding SVA attenuates according to equation (1) the ROM 101 of the inverse SVA, at the receiver, will be programmed with the function $$[1-\alpha((P-N_S)/N_S)^2]^{-1}. \quad (6)$$

Figure 10:
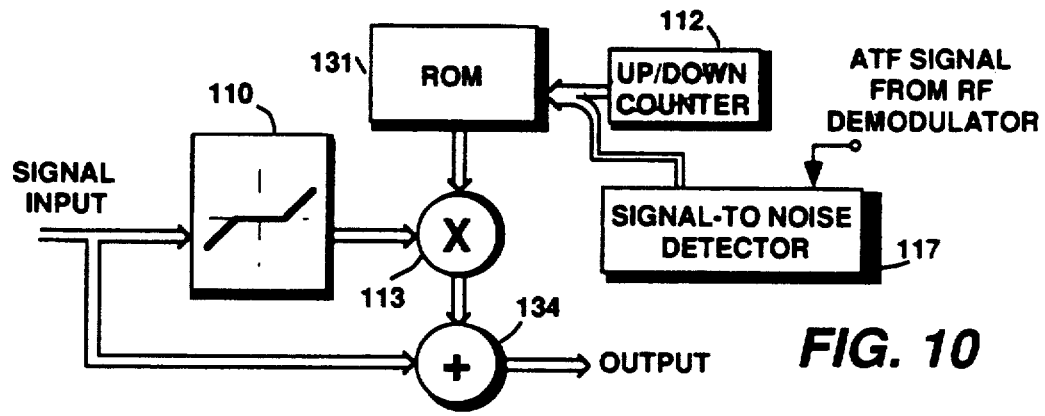
Figure 11:
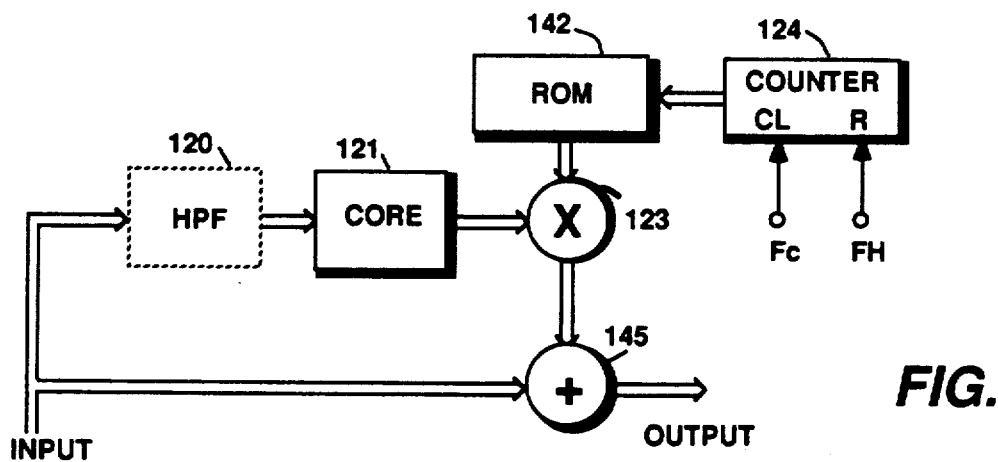

Alternatively if the respective signals only have large amplitude signal excursions spatially variably attenuated, for example by SVA's of the type illustrated in FIGS. 8 or 9, the inverse SVA's at the receiver may be of the form illustrated in FIGS. 10 and 11 respectively. In FIGS. 10 and 11, elements designated with like numerals to elements in FIGS. 8 and 9 are similar and perform similar functions. The circuitry of FIGS. 10 and 11 are respectively similar to the circuitry of FIGS. 8 and 9 with two exceptions. The subtracting circuits 114 and 125 have been replaced by adders 134 and 145, and the ROM's 111 and 122 have been replaced by ROM's 131 and 142. Assuming that the circuits of FIGS. 10 and 11 are to perform the inverse function of the circuitry of FIGS. 8 and 9 respectively, and that the ROM's 111 and 122 are programmed with respective functions f(x) where x is the spatial variable, then the ROM's 131 and 142 are programmed with the functions F(x) given by $$F(x)=f(x)/(1-f(x)). \quad (7)$$

More explicitly if ROM 122 is programmed in accordance with the function $\alpha((P-N_L/2)/N_L/2)^2$ then ROM 142 is programmed with the function F(p) given by $$F(p)=\alpha((P-N_2/2)/N_L/2)^2/[1-\alpha((P-N_2/2)/N_L/2)^2] \quad (8)$$

If the input signals to the FIGS. 10 or 11 circuits are of the form $S(1-f(x))$ the output provided by the respective adders 134 and 145 will be $$S(1-f(x))+\frac{f(x)}{(1-f(x))}(S(1-f(x)))=S \quad (9)$$

The inverse spatially variable attenuation at the receiver may introduce unusual noise characteristics in the reconstituted signal under low signal-to-noise conditions. To preclude introduction of such noise characteristics the SVA's in the receiver may be made adaptive responsive to the signal-to-noise ratio of the received signal. The adaptation is of the form to provide less than total correction of the attenuated signals in low signal-to-noise situations. Adaption responsive to signal-to-noise ratio may be accomplished in the circuits of FIGS. 10 and 11 by including a plurality of functions $F(x)_i$ in respective tables in the ROM's 131 and 142. The appropriate table may be addressed by concatenating control signals from a signal-to-noise ratio detector 117 with the address signals from the respective ROM address counter. The respective functions $F(x)_i$ may be of the form $$F(x)_i=[f(x)-(1-R/100)]/(1-f(x))$$

where R corresponds to the degree of desired reconstitution in percent.

The invention has been described in the environment of an EDTV system, however its implementation is not limited to such applications. For example, many projection television systems display their images on a flat screen wherein the left and right extremities of the image appear dimmer than the center portion. Spatially variable gain elements may be included in a projection TV receiver to vary the gain of the image representative signals across the image, that is the gain of the signals may be enhanced at the extremities of each horizontal line relative to the center of the lines.

The circuitry of FIGS. 7-11 are exemplary as are the spatially variable functions. Specific details of the exemplary circuits have been excluded to avoid confusion. For example compensating delay elements may be required in the signal paths between the signal input port and the direct connections to the respective adders (subtractors) to temporally align the two signals coupled to the respective adders (subtractors). However, details of this type will be understood by those skilled in the art and thus need not be discussed.

All of the circuits of FIGS. 7 to 11 are spatially variable functional elements (e.g., attenuators or gain elements). Some however include adder circuits and others include subtractor circuits for combining an input signal and a spatially varied input signal. In the claims the term "combining circuit" is meant to include adder and substractor circuitry. In addition, the phrase "changing monotonically" as applied to the variable function, is meant to include segments of the variable for which the function may be constant.

What is claimed is:

1. In a video signal processing system for processing a video signal including luminance and chrominance components representing an image and occurring as successive horizontal lines of image information, apparatus for spatially transforming at least one of the luminance and chrominance components including means for generating a control signal indicative of the horizontal position, p, of the instantaneous value of said at least one component, and transfer function means having a transfer function variable in response to said control signal for processing said at least one component, said transfer function changing monotonically over half of a horizontal line and is symmetric about the center of the horizontal line.

2. The apparatus set forth in claim 1 wherein said transfer function means includes an attenuation/gain element for attenuating/amplifying said at least one component as a function of the instantaneous horizontal image position of said at least one component represents.

3. The apparatus set forth in claim 2 wherein said attenuation/gain element includes
   means responsive to said control signal for providing variable scale factors W(p) which are a function of horizontal positions, p, indicated by said control signal;

scaling means having an input port coupled for receiving said at least one component and responsive to said scale factors W(p) for producing a scaled version of said at least one component.

4. The apparatus set forth in claim 3 wherein said means responsive to said control signal for providing variable scale factors W(p) comprises:

a ROM having an address input port coupled to receive said control signal, an output port for providing said scale factors W(p), an programmed at respective memory locations, p, with said scale factors W(p).

5. The apparatus set forth in claim 2 further including:

signal combining means having a first input port for receiving said at least one component, a second input port coupled to said attenuation/gain element for receiving attenuated/amplified said at least one component provided thereby, and an output port for providing said at least one component variably scaled over a horizontal line interval.

6. The apparatus set forth in claim 5 further including:

signal coring means, having an input port for receiving said at least one component, and an output port coupled to said attenuation/gain element, said coring means for passing only signal values which exceed a predetermined magnitude.

7. The apparatus set forth in claim 6 further including:

filter means, for passing a predetermined range of signal frequencies, said filter means coupled in cascade with said signal coring means and said attenuation/gain element.

8. The apparatus set forth in claim 5 further including:

filter means, for passing a predetermined range of signal frequencies, said filter means coupled in cascade with said attenuation/gain element.

9. The apparatus set forth in claim 8 wherein said video signal processing system is a television receiver and said attenuation/gain element performs a decreasing signal gain function from the extremities of said horizontal lines towards the center of said horizontal lines.

10. The apparatus set forth in claim 9 wherein said gain function is piecewise linear.

11. The apparatus set forth in claim 8 wherein said video signal processing system is a television signal encoder and said attenuation/gain element performs a decreasing signal attenuation function from the extremities of said horizontal lines towards the center of said horizontal lines.

12. The apparatus set forth in claim 11 wherein said gain function is piecewise linear.

13. The apparatus set forth in claim 2 further including:

means responsive to said video signal for generating a further control signal indicative of a noise characteristic of said video signal; and
wherein said attenuation/gain element is responsive to said further control signal for attenuating/amplifying said at least one component as a function of said noise characteristic.

14. In a television receiver of the type for reproducing images from transmitted signals representing fields/frames of horizontal lines of image information including luminance and chrominance components, and wherein at least one of said luminance and chrominance components has been subjected to spatially variable attenuation, apparatus for reconstituting said at least one of said luminance and chrominance components, comprising:

decoding means, responsive to said transmitted signals for providing said luminance and chrominance components;

means responsive to said transmitted signals for generating a control signal indicative of the horizontal position of an image point currently represented by said at least one of said luminance and chrominance components;

spatially variable attenuation means, coupled to receive the at least one of said luminance and chrominance components, and responsive to said control signal, for performing a spatially variable function on said separated at least one of said luminance and chrominance components, which spatially variable function is substantially inverse to said to spatially variable attenuation.

15. The apparatus set forth in claim 14 wherein said spatially variable attenuation means comprises:

means responsive to said control signal for providing variable scale factors W(p) which are a function of horizontal positions, p, indicated by said control signal;

scaling means having an input port coupled for receiving said at least one of said luminance and chrominance components and responsive to said scale factors W(p) for producing a scaled version of said at least one signal component.

16. The apparatus set forth in claim 15 further including:

signal combining means having a first input port for receiving said at least one of said luminance and chrominance components, a second input port coupled to said scaling means for receiving said scaled version, and an output port for providing said at least one of said luminance and chrominance components variably scaled over at least a portion of a horizontal line interval.

17. The apparatus set forth in claim 16 further including:

signal coring means, having an input port for receiving said at least one of said luminance and chrominance components, and an output port coupled to the input port of said scaling means, said coring means for passing only signal values which exceed a predetermined magnitude.

18. The apparatus set forth in claim 17 further including:

filter means, for passing a predetermined range of signal frequencies, said filter means coupled in cascade with said signal coring means and said signal scaling means.

19. The apparatus set forth in claim 16 further including:

filter means, for passing a predetermined range of signal frequencies, said filter means coupled in cascade with said signal scaling means.

20. The apparatus set forth in claim 15 wherein said means responsive to said control signal for providing variable scale factors W(p) comprises:

a ROM having an address input port coupled to receive said control signal, an output port for providing said scale factors W(p), and programmed at respective memory locations, p, with said scale factors W(p).

21. The apparatus set forth in claim 14 wherein said at least one of said luminance and chrominance components is spatially/temporally transposed such that information representing ends of a horizontal line is translated toward the center of said horizontal line and information representing the interior to a horizontal line is translated towards the ends of said horizontal line, said apparatus further including:
   means cascade coupled with said spatially variable attenuation means for spatially translating said spatially transposed at least one of said luminance and chrominance components so that information representing respective end and interior information are respectively arranged to occupy end and interior line intervals.

22. The apparatus set forth in claim 14 further including;
   means responsive to said transmitted signals for generating a further control signal indicative of a noise characteristic of said transmitted signals; and
   wherein said spatially variable attenuation means is responsive to said further control signal for attenuating/amplifying said separated at least one of said luminance and chrominance components as a function of said noise characteristic.

23. In a television signal encoder of the type for generating television signals representing images formatted in fields/frames of horizontal lines of image information including luminance and chrominance components, apparatus for encoding such image information, comprising:
   means for generating a control signal indicative of horizontal positions, p, of image points currently represented by one of said luminance and chrominance components;
   spatially variable attenuation means, coupled to receive at least one of said luminance and chrominance components, and responsive to said control signal, for performing a spatially variable attenuation function on said at least one of said luminance and chrominance components, which spatially variably attenuation function performs greater attenuation near extremities of said horizontal lines and lesser attenuation toward the interior of said horizontal lines.

24. The apparatus set forth in claim 23 wherein said spatially variable attenuation means comprises:
   means responsive to said control signal for providing variable scale factors W(p) which are a function of horizontal positions, p, indicated by said control signal;
   scaling means having an input port coupled for receiving said at least one of said luminance and chrominance components and responsive to said scale factors W(p) for producing a scaled version of said at least one of said luminance and chrominance components.

25. The apparatus set forth in claim 24 further including:
   signal combining means having a first input port for receiving said at least one of said luminance and chrominance components, a second input port coupled to said scaling means for receiving said scaled version, and an output port for providing said at least one of said luminance and chrominance components variably scaled over a horizontal line interval.

26. The apparatus set forth in claim 25 further including:
   signal coring means, having an input port for receiving said at least one of said luminance and chrominance components, and an output port coupled to the input port of said scaling means, said coring means for passing only signal values which exceed a predetermined magnitude.

27. The apparatus set forth in claim 26 further including:
   filter means, for passing a predetermined range of signal frequencies, said filter means coupled in cascade with said signal coring means and said signal scaling means.

28. The apparatus set forth in claim 23 further including means coupled to said spatially variable attenuation means for transposing said at least a portion of luminance and chrominance components such that information representing end to interior portions are translated to occur spatially/temporally in reverse order.

* * * * *